United States Patent
Lo

(10) Patent No.: US 10,065,704 B1
(45) Date of Patent: Sep. 4, 2018

(54) PEDAL FOR ELECRIC BIKE FOR TRANSMITTING TORUQE SIGNALS

(71) Applicant: Chiu-Hsiang Lo, Taichung (TW)

(72) Inventor: Chiu-Hsiang Lo, Taichung (TW)

( * ) Notice: Subject to any disclaimer, the term of this patent is extended or adjusted under 35 U.S.C. 154(b) by 1 day.

(21) Appl. No.: 15/432,927

(22) Filed: Feb. 15, 2017

(51) Int. Cl.
  *B62M 3/08* (2006.01)
  *B62M 6/50* (2010.01)
(52) U.S. Cl.
  CPC ............... *B62M 3/08* (2013.01); *B62M 6/50* (2013.01)
(58) Field of Classification Search
  CPC .. B62M 3/08; B62M 6/50; G01L 3/24; B62K 2207/00
  See application file for complete search history.

(56) References Cited

U.S. PATENT DOCUMENTS

| 8,844,404 | B2* | 9/2014 | Chen | B62M 3/08 74/594.4 |
| 9,150,279 | B2* | 10/2015 | Gros | B62M 6/50 |
| 9,481,428 | B2* | 11/2016 | Gros | B62M 3/08 |

* cited by examiner

*Primary Examiner* — Thomas C Diaz

(57) ABSTRACT

A pedal includes an axle connected with a crank shaft. An axle seat is rotatably connected to the axle and a pedal unit is connected to the axle seat. At least one torque detection sensor is connected to at least one end of the axle seat by the least one fixing unit. When the pedal unit is applied by a force, the force is transferred to the at least one torque detection sensor via the axle seat. The at least one torque detection sensor generates a signal corresponding to the force and the signal is transferred to at least one signal transmitting module. The signal is used to control the output of the assistance system of the electric bike.

11 Claims, 10 Drawing Sheets

US 10,065,704 B1

PEDAL FOR ELECRIC BIKE FOR TRANSMITTING TORUQE SIGNALS

BACKGROUND OF THE INVENTION

1. Fields of the Invention

The present invention relates to a pedal for an electric bike, and more particularly, to a pedal for an electric bike and the pedal receives torque and transmits signals to the bicycle.

2. Descriptions of Related Art

The conventional electric bikes usually have a torque detection member or a speed detection member which detects the force that the riders tread the pedals, and the torque that applied to the pedals or the frequency that the riders tread the pedals will be used to adjust the control module to output assistance force to the electric bike. Nevertheless, the torque detection member or the speed member usually is installed to driving part between the crank shaft and the chainwheel. The installation cost will be high due to the complexity of that position of the electric bikes.

Besides, the torque detection member or the speed detection member, or the wireless communication module is powered by batteries. The batteries are not installed by quick-release mechanism, and this may not convenient for the riders.

The present invention intends to provide a pedal for an electric bike and improves the shortcomings mentioned above.

SUMMARY OF THE INVENTION

The present invention relates to a pedal of an electric bike and comprises an axle connected with a crank shaft. An axle seat is rotatably connected to the axle and a pedal unit is connected to the axle seat. At least one torque detection sensor is connected to at least one end of the axle seat by the least one fixing unit. When the pedal unit is applied by a force, the force is transferred to the at least one torque detection sensor via the axle seat. The at least one torque detection sensor generates a signal corresponding to the force and the signal is transferred to at least one signal transmitting module. The signal is used to control the output of the assistance system of the electric bike.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
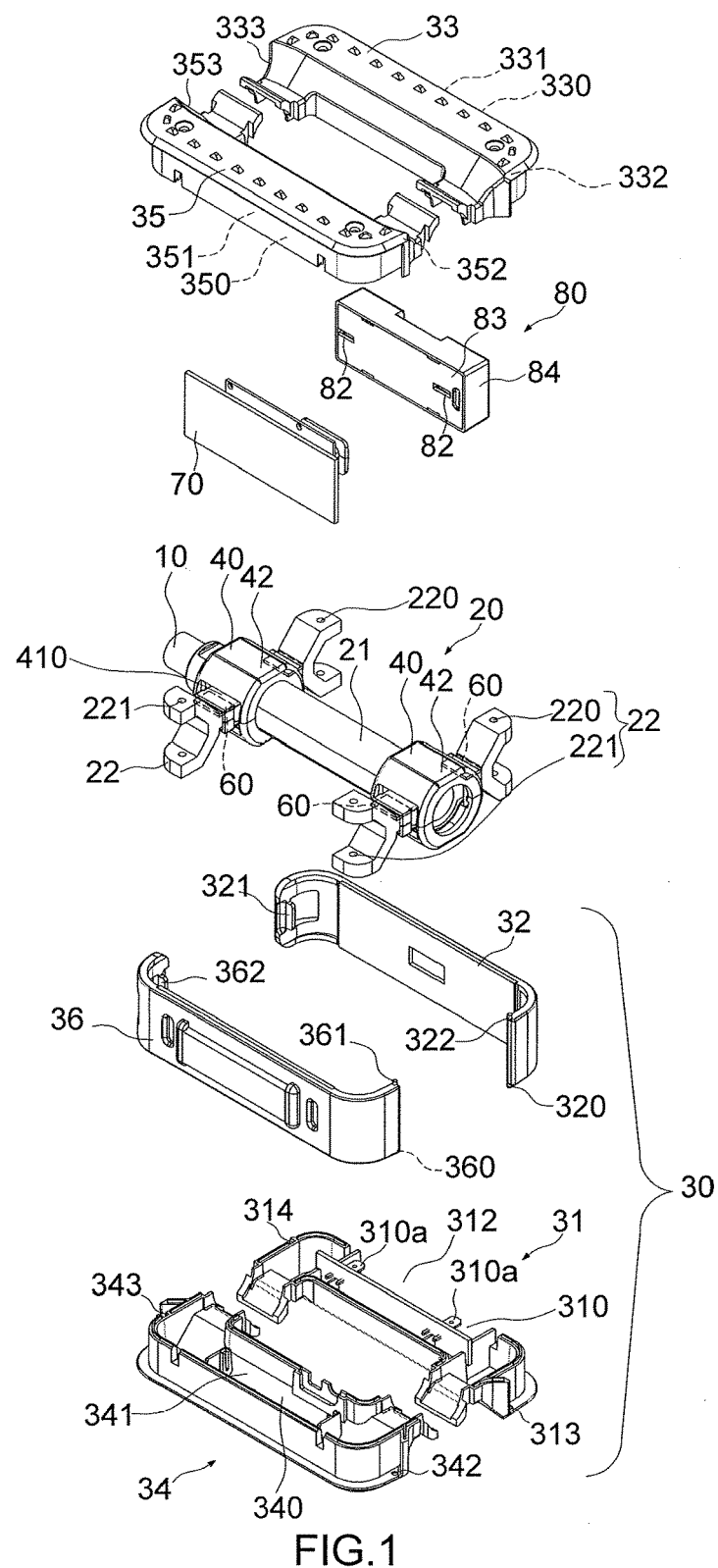
FIG. 1 is an exploded view of the pedal of the present invention.
Figure 2:
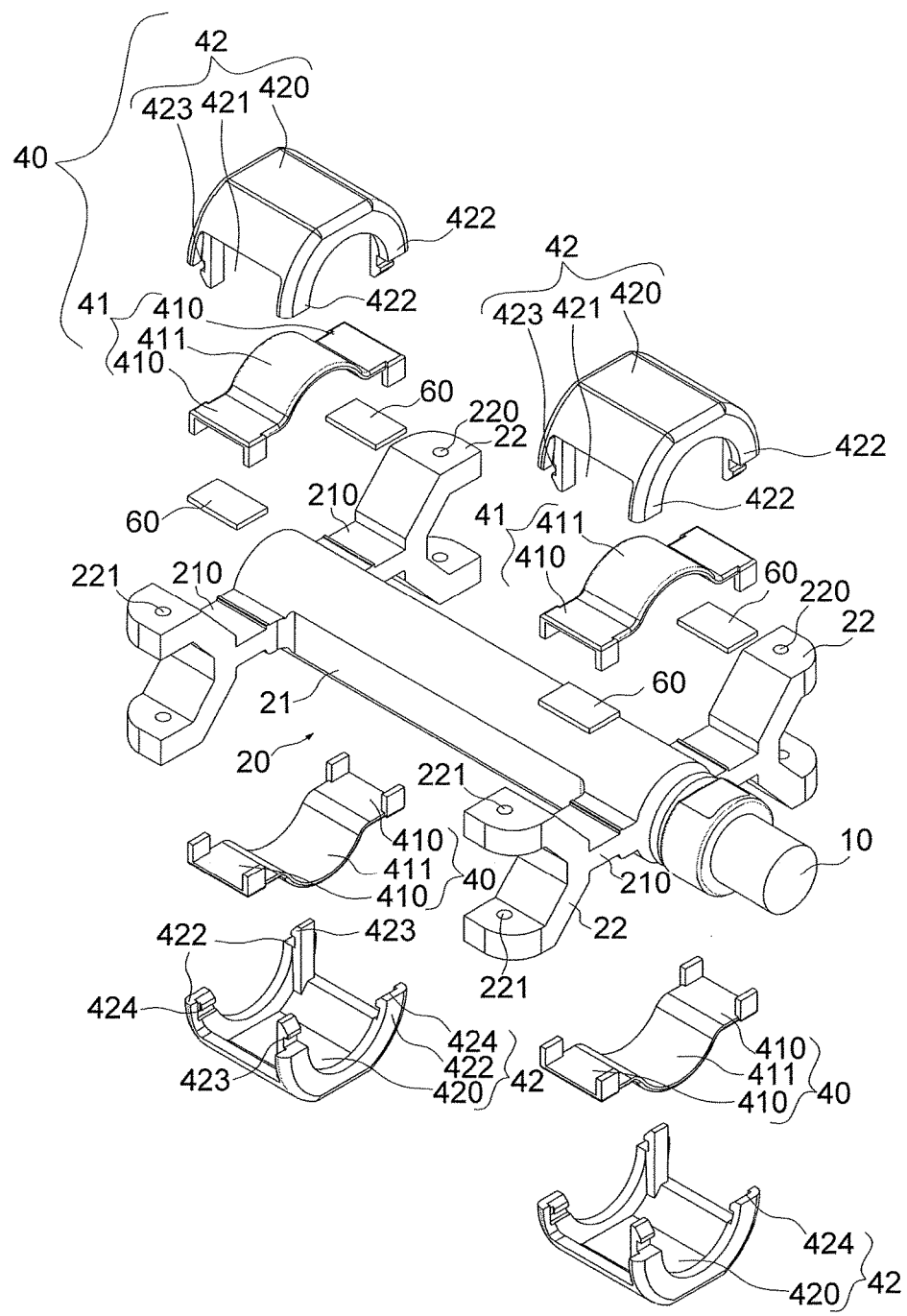
FIG. 2 is an exploded view of the fixing unit of the pedal of the present invention.

Referring to FIGS. 1, 2, 4, 9 and 10, the pedal of the present invention comprises an axle 10 connected with the crank shaft of the electric bike or a stationary bike. An axle seat 20 is rotatably connected to the axle 10. A pedal unit 30 is connected to the axle seat 20. At least one fixing unit 40 connects at least one torque detection sensor 60 (a torque detection member, a pressure detection member or a strain gauge) to at least one end of the axle seat 20. When the pedal unit 30 is applied by a force, the force is transferred to the at least one torque detection sensor 60 via the axle seat 20. The at least one torque detection sensor 60 generates a signal corresponding to the force and the signal is transferred to the at least one signal transmitting module 50 which can be wired or wireless. A control module 70 receives the signal and activates a driving circuit 91 to drive a motor 90. A battery 81 is used to provide power to the at least one torque detection sensor 60 and the control module 70.

The axle seat 20 includes a tube 21 through which the axle 10 extends, and at least two connection units 22 which connect the pedal unit 30. The tube 21 has an extension 210 from at least one end thereof so as to be connected to one of the at least two connection units 22. The at least one torque detection sensor 60 is connected to the extension 210. The at least one fixing unit 40 has a pressing section 410 on each of two ends thereof, and the at least one fixing unit 40 is mounted to at least one end of the tube 21. The pressing section 410 presses the at least one torque detection sensor 60 on the extension 210.

Figure 3:
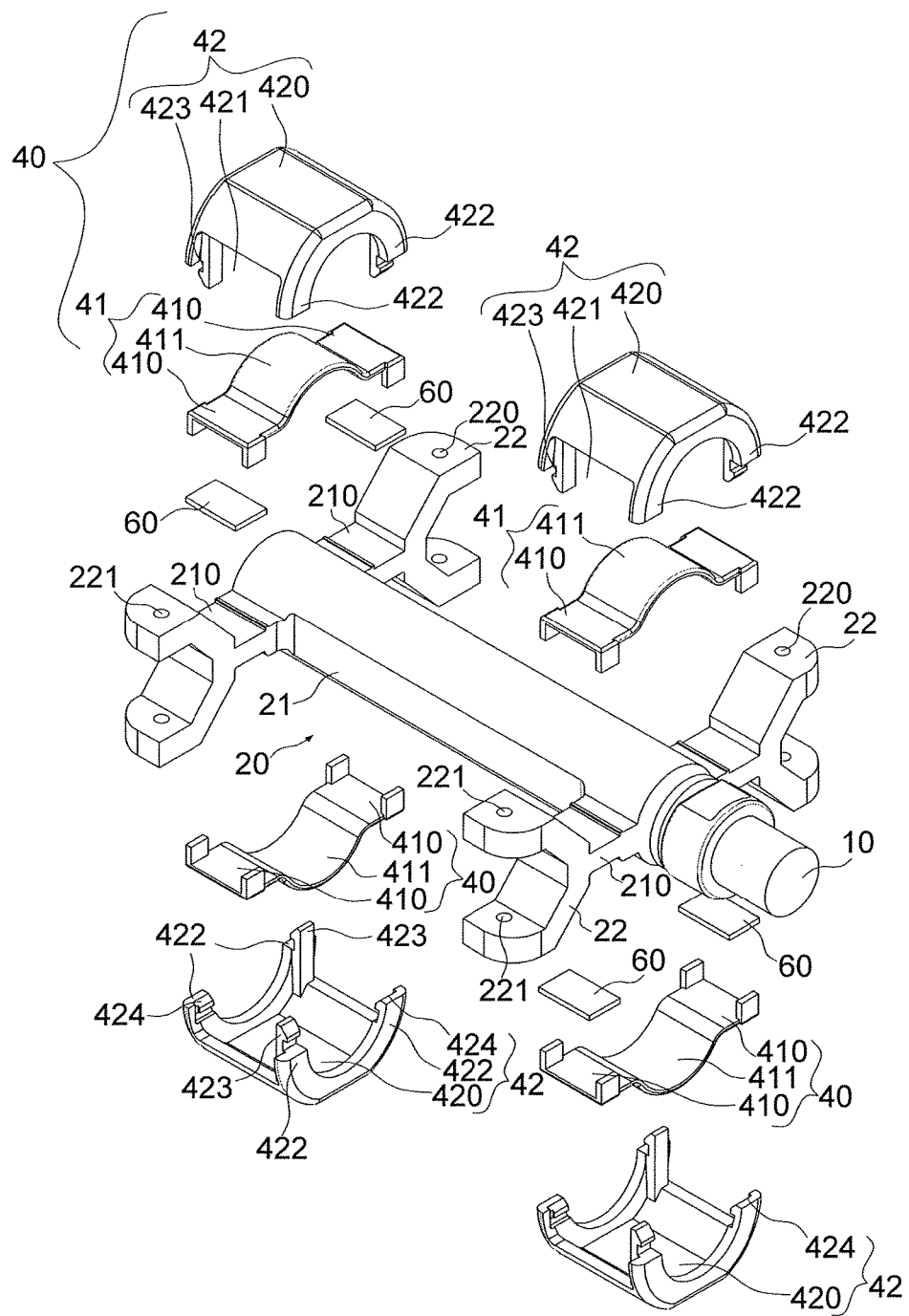
FIG. 3 is an exploded view of another embodiment of the fixing unit of the pedal of the present invention.

As shown in FIG. 3, in one embodiment, there are two connection units 22 and two fixing units 40, and there are four torque detection sensors 60. The four torque detection sensors 60 are respectively connected to four extensions 210 and located on the same plane. The extensions 210 are flexible. The two connection units 22 and the two fixing units 40 are respectively located on two ends of the tube 21. Each of the two fixing units 40 includes two pressing plates 44 located on two sides of the tube 21. Each pressing plate 44 has a first curved section 411 and two pressing sections 410 respectively extending from two sides of the first curved section 411. The four pressing sections 410 on one side of the tube 21 press on the four torque detection sensors 60 on the four extensions 210. The four pressing sections 410 on the other side of the tube 21 press on the four extensions 210. Two sets of pressing members 42 are respectively located on two sides of the tube 21. Each of the two set of pressing members 42 has two corresponding pressing members 42 being respectively located on two sides of the tube 21. Each pressing member 42 is mounted to the curved portion 420 and includes two recesses 421 through which the pressing sections 410 extend.

Each of the pressing members 42 has four ridges 422 respectively extending from four distal ends thereof. Two of the four ridges 422 of each of the two corresponding pressing members 42 have a first snapping portion 423 respectively, and Two of the four ridges 422 of each of the two corresponding pressing members 42 have a second snapping portion 424 respectively, and the first snapping portion 423 and the second snapping portion 424 of the corresponding two pressing members 42 on two side of the tube 21 are detachably connected with each other. When the tread is applied by a force, the extensions 210 deform, and the torque detection sensors 60 are pressed by the pressing sections 410 so as to generate the signals.

Figure 4:
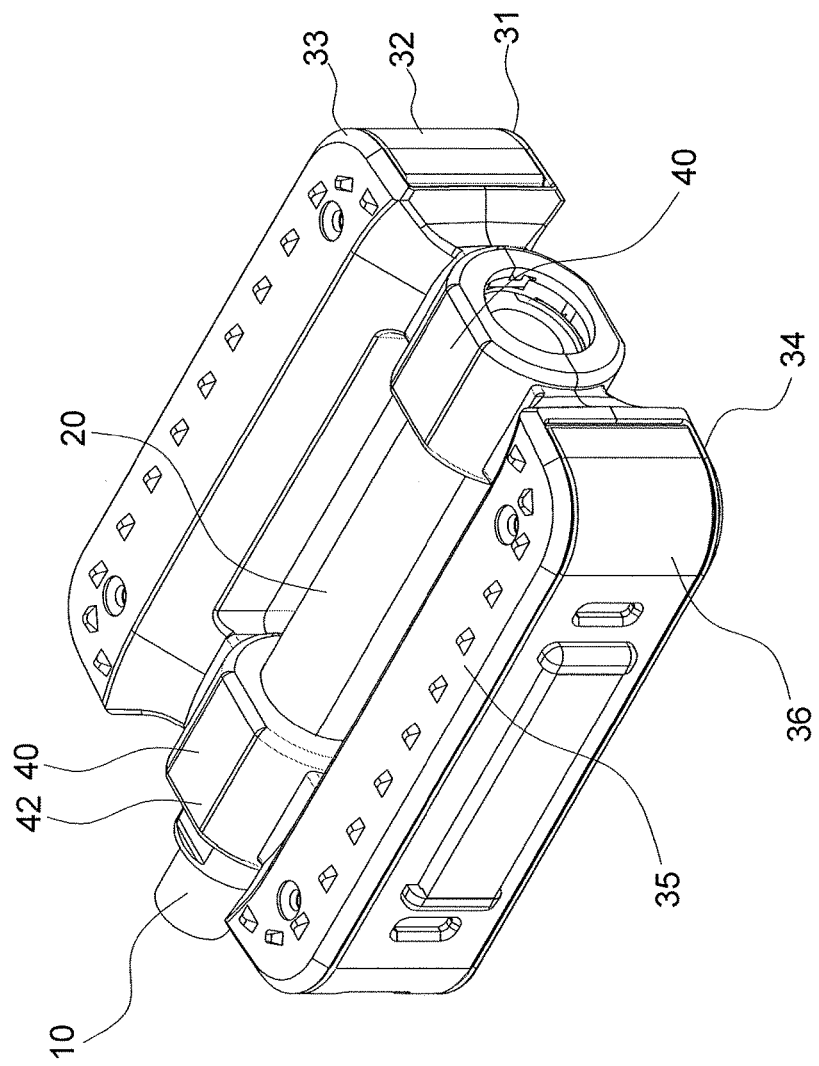
FIG. 4 is a perspective view to show the pedal of the present invention.
Figure 5:
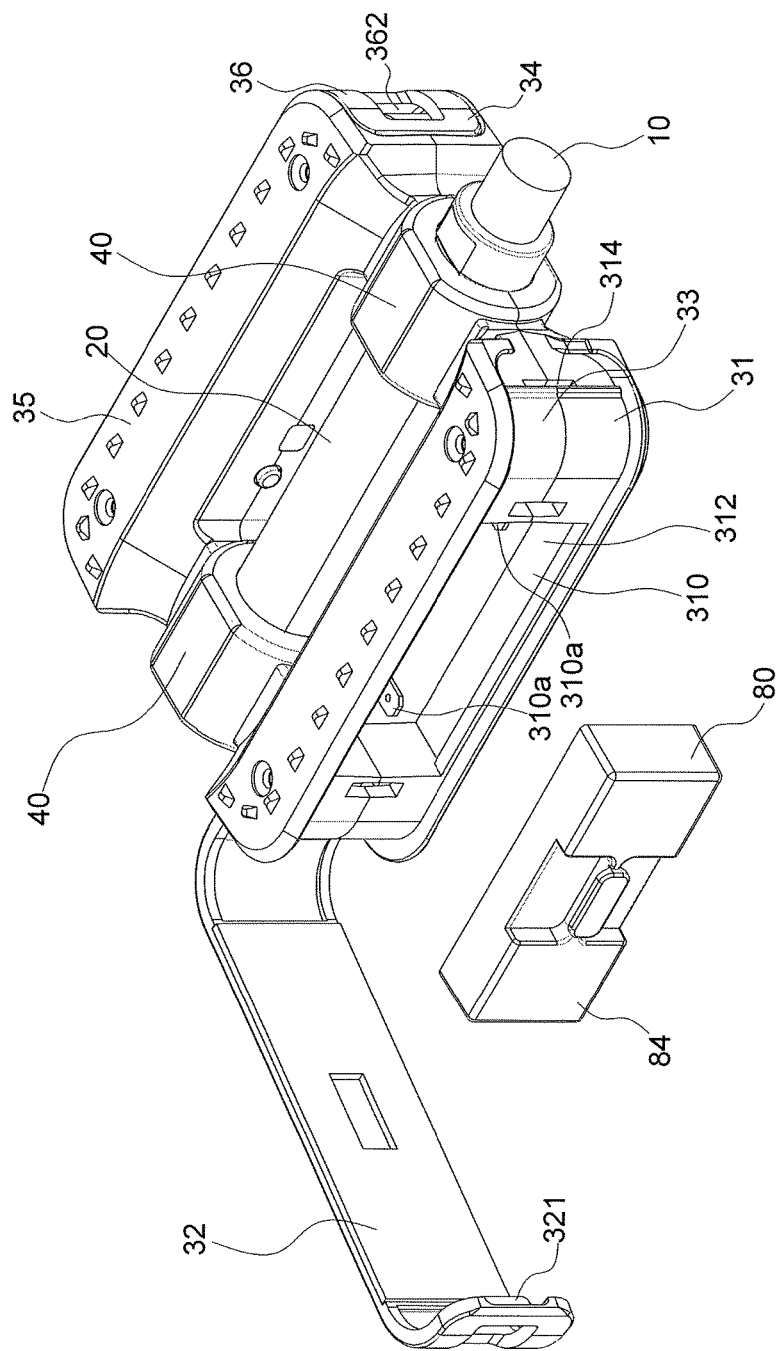
FIG. 5 shows that the battery is removed from the pedal of the present invention.

As shown in FIGS. 1, 4 and 5, the pedal unit 30 comprises a first base 31 which is connected to the axle seat 20 and has a first room 310. A first opening 312 is defined in one side of the first room 310. The first base 31 has a first end a second end which is located opposite to the first end. The first end of the first base 31 has a first pivotal portion 313. The second end of the first base 31 has a first receiving pivotal portion 314. A first plate 32 is mounted to the first opening 312 and includes a first end and a second end which is located opposite to the first end. The first end of the first plate 32 has a first pivotal member 320, and the second end of the first plate 32 has a first protrusion 321. The first pivotal member 320 is pivotably connected to the first pivotal portion 313. The first protrusion 321 is connected to the first receiving pivotal portion 314. The battery 81 is received in the first room 310. When the first protrusion 321 is dis-connected from the first receiving pivotal portion 314, the first plate 32 is pivoted relative to the first base 31 and about the first pivotal portion 313 to open the first opening 312, the battery 81 is removed from the first room 310 via the first opening 312.

As shown in FIGS. 1, 4 and 5, the pedal unit 30 comprises a first cover 33 which is located on the axle seat 20 and connected to the first base 31. The first cover 33 has a second room 330 which has a second opening 331 defined in one side thereof. The first cover 33 has a first end and a second end which is located opposite to the first end. The first cover 33 has a second pivotable member 332 on the first end thereof, and the first cover 33 has a second receiving portion 333 on the second end thereof. The first plate 32 has a second pivotal member 322 on the first end thereof and the second pivotal member 322 is pivotably connected to the second pivotable member 332. The first protrusion 321 is connected to the second receiving portion 333. The battery 81 is received in the first and second rooms 310, 330. When the first protrusion 321 is dis-connected from the first receiving pivotal portion 314 and the second receiving portion 333, the first plate 32 is pivoted relative to the first base 31 and about the first pivotal portion 313 and the second pivotal portion 332 to open the first and second openings 312, 331, such that the battery 81 is removed from the first and second rooms 310, 330 via the first and second openings 312, 331.

The axle seat 20 has two connection units 22 and each connection unit 22 has a first connection portion 220 and a second connection portion 221 on two side thereof respectively. The first connection portion 220 and the second connection portion 221 are in Y-shaped respectively. The first base 31 and the first cover 33 are respectively connected to the first connection portions 220 of the two connection units 22. The first base 31 and the first cover 33 are axially parallel to the axle 10.

The pedal unit 30 further comprises a second plate 36. The second base 34 has a third room 341 which has a third opening 340. The second cover 35 has a fourth room 351 which has a fourth opening 350. At least one electronic part, such as the control module 70 and the signal transmitting module 50, is received in the third and fourth rooms 341, 351. The second base 34 has a third pivotal portion 342 and a third receiving portion 343. The second cover 35 has a fourth pivotal portion 352 and a fourth receiving portion 353. A second plate 36 has a third pivotal portion 360, a fourth pivotal member 361 and a second protrusion 362. The third pivotal portion 360 and the fourth pivotal member 361 are respectively pivotably connected to the third pivotal portion 342 and the fourth pivotal portion 352. The second protrusion 362 is connected to the third receiving portion 343 and the fourth receiving portion 353. When the second protrusion 362 is dis-connected from the third receiving portion 343 and the fourth receiving portion 353, the second plate 32 is pivoted relative to the second base 34 and the second cover 35, and about the third pivotal portion 342 and the fourth pivotal portion 352. The second base 34 and the second cover 35 are respectively connected to the second connection portions 221 of the two connection units 22. The second base 34 and the second cover 33 are axially parallel to the axle 10.

Figure 6:
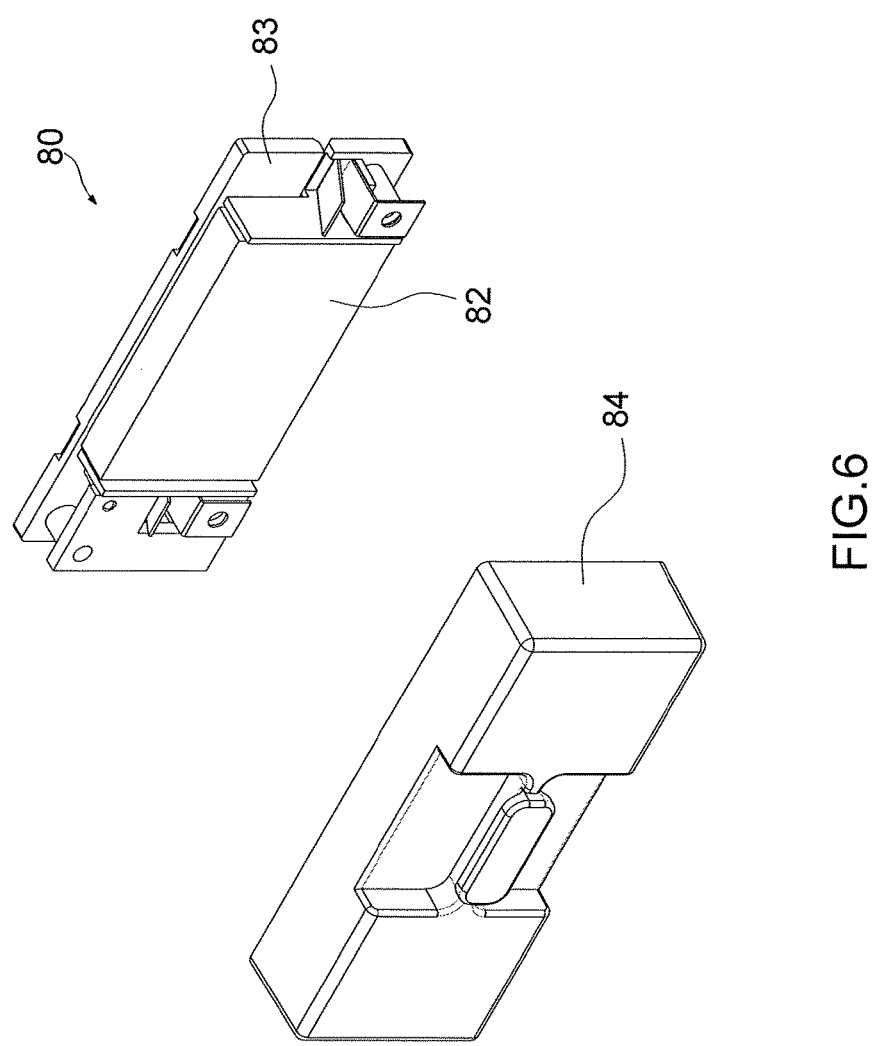
FIG. 6 shows battery unit and the battery cover.
Figure 7:
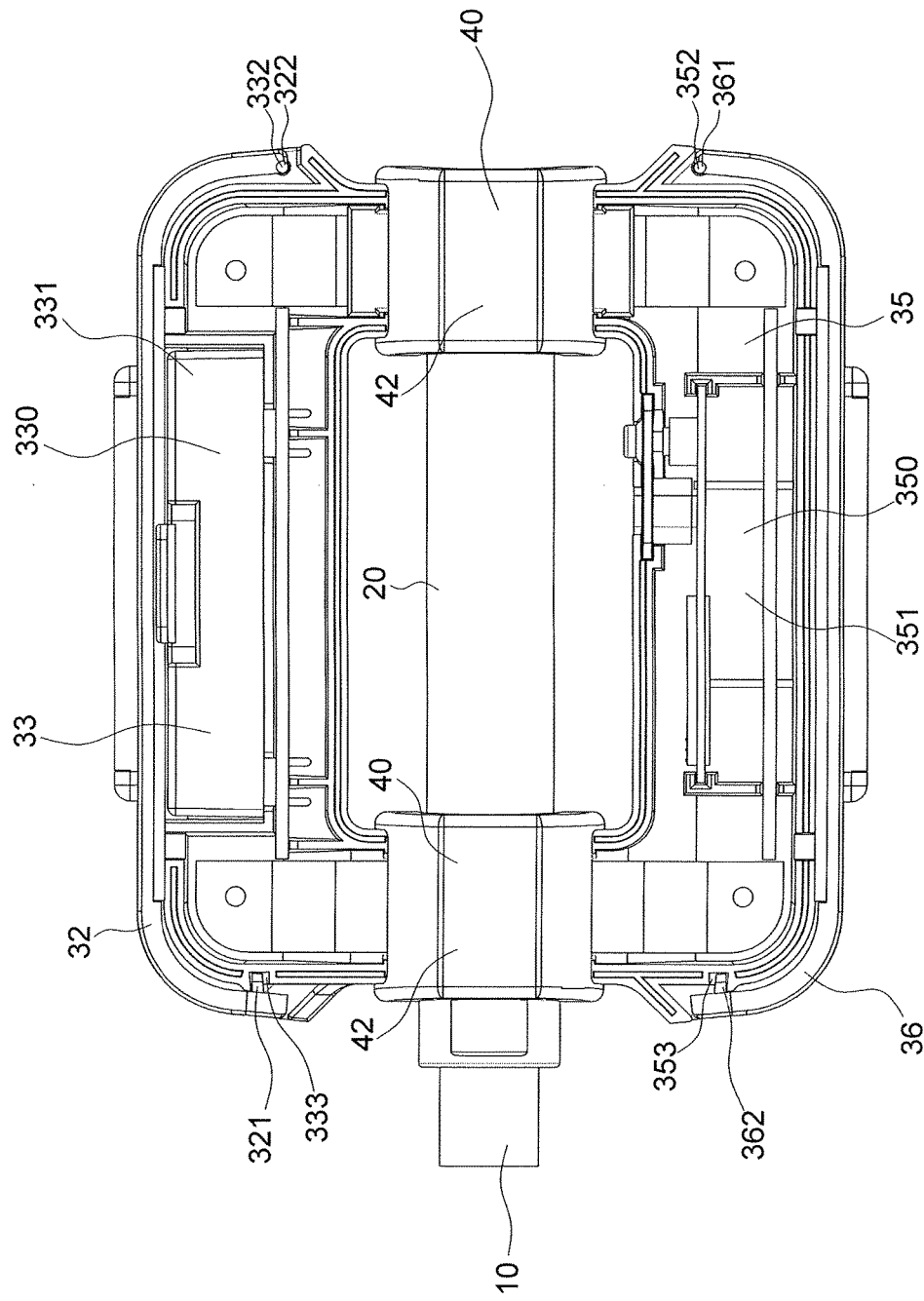
FIG. 7 shows that the first plate is not yet pivoted.
Figure 8:
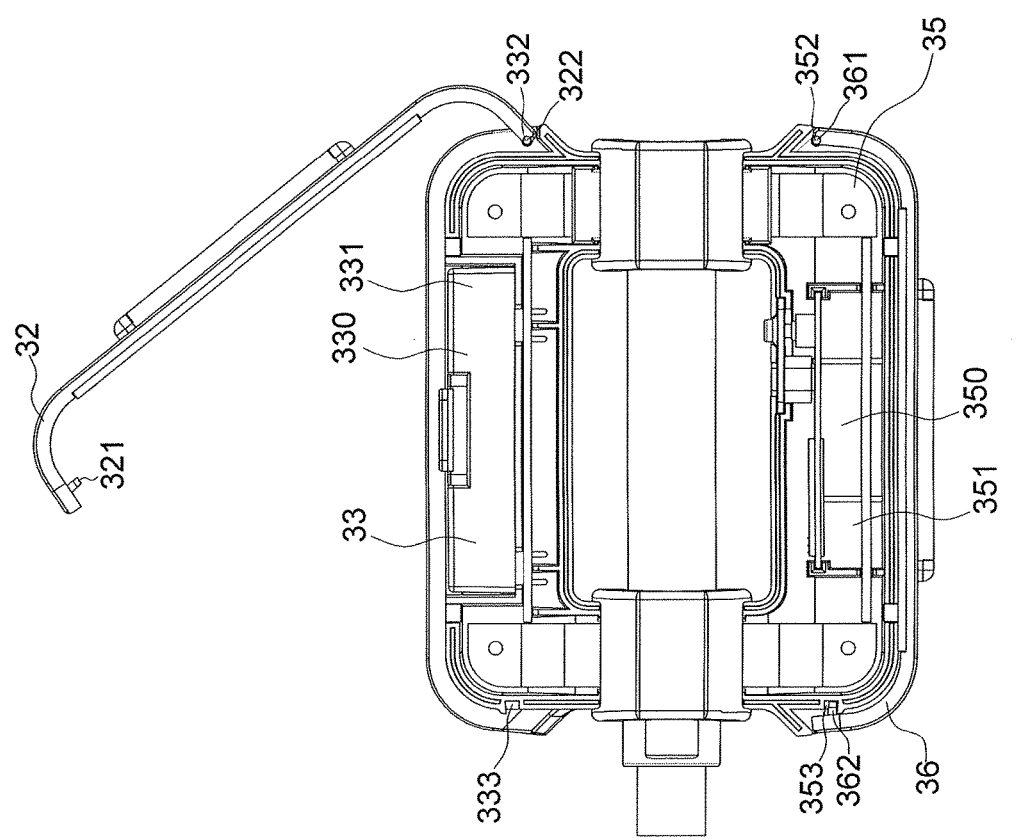
FIG. 8 shows that the first plate is pivoted.
Figure 9:
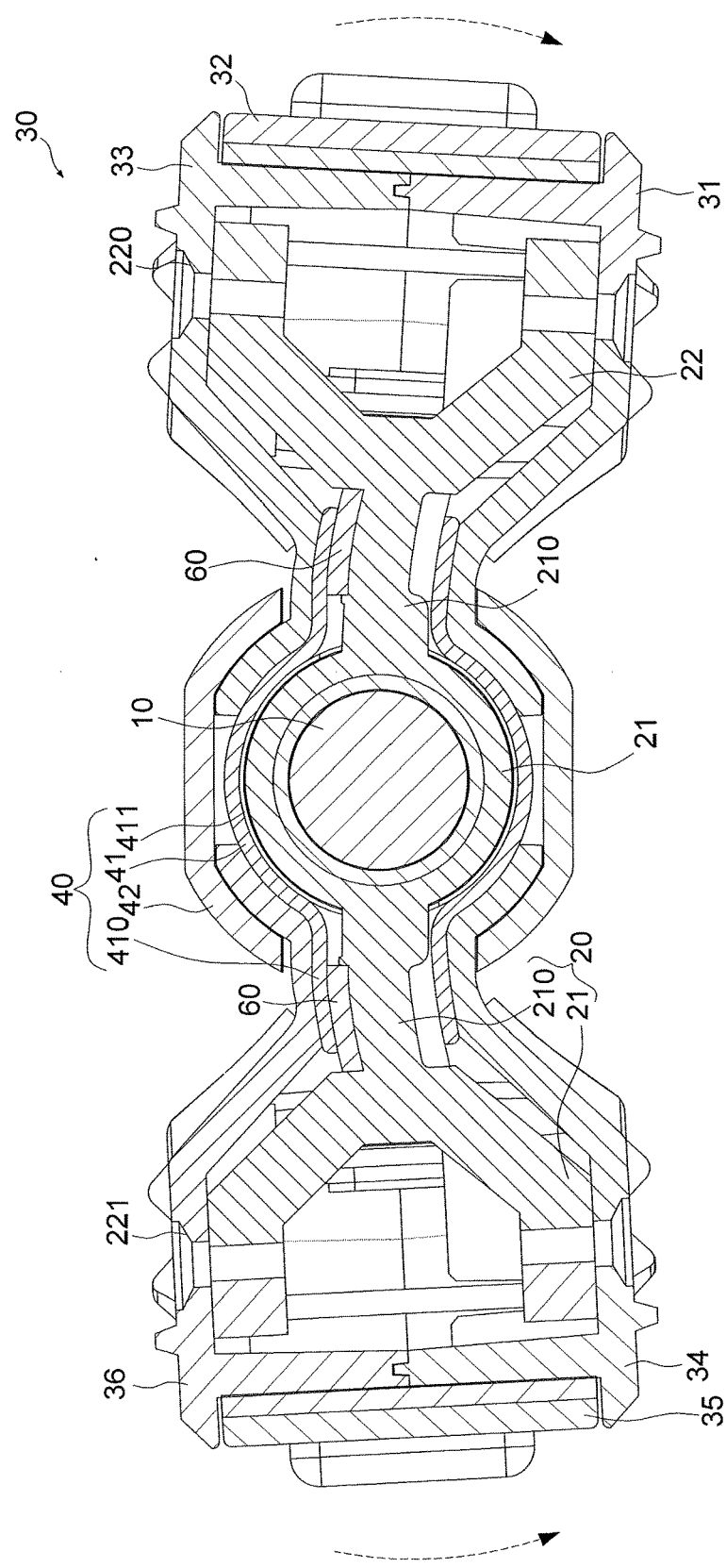
FIG. 9 shows that a force is applied to the pedal and the axle seat is deformed.
Figure 10:
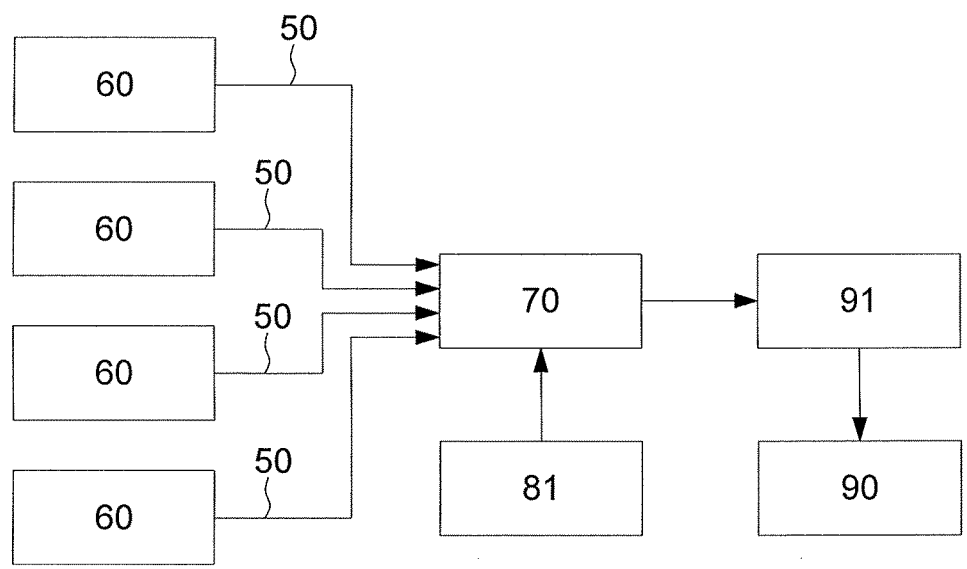
FIG. 10 shows the diagram of the driving circuit of the pedal.

As shown in FIGS. 1 and 4, the first room 310 has two engaging portions 310a on one wall thereof. The battery 81 is received in a battery unit 80. The battery unit 80 has two cooperation portions 82 which is engaged with the engaging portions 310a when the battery unit 80 is received in the first room 310. As shown in FIGS. 5 and 6, the battery unit 80 includes a base 83 and a battery cover 84 which is movably connected to the base 83. Two slots 82 are defined in the base 83, and the engaging portions 310a are protruded electrodes which are engaged with the slots 82.

While we have shown and described the embodiment in accordance with the present invention, it should be clear to those skilled in the art that further embodiments may be made without departing from the scope of the present invention.

What is claimed is:

1. A pedal comprising:
   an axle adapted to be connected with a crank shaft;
   an axle seat rotatably connected to the axle;
   a pedal unit connected to the axle seat;
   at least one torque detection sensor;
   at least one signal transmitting module, and
   at least one fixing unit connecting the at least one torque detection sensor to at least one end of the axle seat, when the pedal unit is applied by a force which is transferred to the at least one torque detection sensor via the axle seat, the at least one torque detection sensor generates a signal corresponding to the force and the signal is transferred to the at least one signal transmitting module, wherein the axle seat including a tube through which the axle extends and at least two connection units which connect the pedal unit, the tube having an extension from at least one end thereof so as to be connected to one of the at least two connection units, the at least one torque detection sensor being connected to the extension, the at least one fixing unit having a pressing section on each of two ends thereof, the at least one fixing unit being mounted to at least one end of the tube, and the pressing section pressing the at least one torque detection sensor on the extension.

2. The pedal as claimed in claim 1, wherein there are two connection units and two fixing units, there are four torque detection sensors, the four torque detection sensors are respectively connected to four extensions and located on the same plane, the two connection units and the two fixing units are respectively located on two ends of the tube, each of the two fixing units includes two pressing plates located on two sides of the tube, each pressing plate has a first curved section and two pressing sections respectively extending from two sides of the first curved section, the four pressing sections on one side of the tube press on the four torque detection sensors on the four extensions, the four pressing sections on the other side of the tube press on the four extensions, two sets of pressing members are respectively located on two sides of the tube, each sets of pressing members has two corresponding pressing members, each pressing member is mounted to the curved portion and includes two recesses through which the pressing sections extend.

3. The pedal as claimed in claim 2, wherein each of the two corresponding pressing members has four ridges respectively extending from four distal ends thereof, two of the four ridges of each of the two corresponding pressing members have a first snapping portion, two of the four ridges of each of the two corresponding pressing members have a second snapping portion, the first snapping portion and the second snapping portion of the ridges of the two corresponding pressing members are detachably connected to each other.

4. The pedal as claimed in claim 1, wherein there are two connection units and two fixing units, there are four torque detection sensors, two of the four torque detection sensors are located one a common plane of the two extensions, the other two of the four torque detection sensors are located one a common plane of the other two extensions, the two connection units and the two fixing units are respectively located on two ends of the tube, each of the two fixing units includes two pressing plates located on two sides of the tube, each pressing plate has a first curved section and two pressing sections respectively extending from two sides of the first curved section, the four pressing sections on one side of the tube press on the four torque detection sensors on the four extensions, the four pressing sections on the other side of the tube press on the four extensions, two pressing members are respectively located on two sides of the tube, each pressing member is mounted to the curved portion and includes two recesses through which the pressing sections extend.

5. The pedal as claimed in claim 4, wherein the each of the pressing members has four ridges respectively extending from four distal ends thereof, at least two of the four ridges of the two pressing members on one side of the tube each have a first snapping portion, at least two of the ridges of the two pressing members on the other side of the tube each have a second snapping portion which is detachably connected to the first snapping portion corresponding thereto.

6. The pedal as claimed in claim 5, wherein the pedal unit comprises a first base which is connected to the axle seat and has a first room, a first opening is defined in one side of the first room, the first base has a first end a second end which is located opposite to the first end, the first end of the first base has a first pivotal portion, the second end of the first base has a first receiving pivotal portion, a first plate is mounted to the first opening and includes a first end and a second end which is located opposite to the first end, the first end of the first plate has a first pivotal member, the second end of the first plate has a first protrusion, the first pivotal member is pivotably connected to the first pivotal portion, the first protrusion is connected to the first receiving pivotal portion, the battery is received in the first room, when the first protrusion is dis-connected from the first receiving pivotal portion, the first plate is pivoted relative to the first base and about the first pivotal portion to open the first opening, the battery is removed from the first room via the first opening.

7. The pedal as claimed in claim 6, wherein the pedal unit comprises a first cover which is located on the axle seat and connected to the first base, the first cover has a second room which has a second opening defined in one side thereof, the first cover has a first end and a second end which is located opposite to the first end, the first cover has a second pivotable member on the first end thereof, the first cover has a second receiving portion on the second end thereof, the first plate has a second pivotal member on the first end thereof and the second pivotal member is pivotably connected to the second pivotable member, the first protrusion is connected to the second receiving portion, the battery is received in the first and second rooms, when the first protrusion is dis-connected from the first receiving pivotal portion and the second receiving portion, the first plate is pivoted relative to the first base and about the first pivotal portion and the second pivotal portion to open the first and second openings, the battery is removed from the first and second rooms via the first and second openings.

8. The pedal as claimed in claim 7, wherein the axle seat has two connection units and each connection unit has a first connection portion on one side thereof, the first base and the first cover are respectively connected to the first connection portions of the two connection units, the first base and the first cover are axially parallel to the axle.

9. The pedal as claimed in claim 8, wherein each of the connection units has a second connection portion on the other side thereof, the second connection portions of the two connection units are respectively connected to a second base and a second cover, the second base and the second cover are axially parallel to the axle.

10. The pedal as claimed in claim 9 further comprising a second plate, the second base has a third room which has a third opening, the second cover has a fourth room which has a fourth opening, at least one electronic part is received in the third and fourth rooms, the second base has a third pivotal portion and a third receiving portion, the second cover has a fourth pivotal portion and a fourth receiving portion, a second plate has a third pivotal portion, a fourth pivotal member and a second protrusion, the third pivotal portion and the fourth pivotal member are respectively pivotably connected to the third pivotal portion and the fourth pivotal portion, the second protrusion is connected to the third receiving portion and the fourth receiving portion, when the second protrusion is dis-connected from the third receiving portion and the fourth receiving portion, the second plate is pivoted relative to the second base and the second cover, and about the third pivotal portion and the fourth pivotal portion.

11. The pedal as claimed in claim 6, wherein the first room has at least one engaging portion on a wall thereof, the battery is received in a battery unit, the battery unit has at least one cooperation portion which is engaged with the engaging portion when the battery unit is received in the first room.

* * * * *